United States Patent

Avelines

[15] 3,675,893
[45] July 11, 1972

[54] COCK WITH SPHERICAL CASING

[72] Inventor: Raymond Andre Avelines, Montreuil-sous-Bois, France

[73] Assignee: Crane S.A., Paris, France

[22] Filed: Sept. 30, 1968

[21] Appl. No.: 763,648

[30] Foreign Application Priority Data

April 4, 1968 France..............................68146935

[52] U.S. Cl..............................251/152, 251/315, 251/316, 137/315
[51] Int. Cl..............................F16k 43/00
[58] Field of Search..........................137/315, 454.2, 454.6; 251/163, 315, 316, 317, 152; 285/363, 368

[56] References Cited

UNITED STATES PATENTS

| | | | |
|---|---|---|---|
| 1,021,518 | 3/1912 | Greatorex | 137/315 |
| 3,065,000 | 11/1962 | Stanton | 285/368 X |
| 3,072,139 | 1/1963 | Mosites | 137/454.2 X |
| 3,215,166 | 11/1965 | Meinecke | 285/363 X |
| 3,409,268 | 11/1968 | Gachot | 251/317 X |

*Primary Examiner*—William F. O'Dea
*Assistant Examiner*—David R. Matthews
*Attorney*—Linton & Linton

[57] ABSTRACT

A detachable cock casing of substantially spherical configuration is clamped between registering flanges of pipe sections which are provided with sealing means by a plurality of tie-bolts of which some are adapted to slide in elongated holes formed in said flanges to permit the sliding movement of said tie-bolts away from each other, in their slackened condition, and thus permit the passage, by a movement of translation of the detachable casing in a direction at right angles to the axis of the relevant pipe sections.

3 Claims, 5 Drawing Figures

PATENTED JUL 11 1972 3,675,893
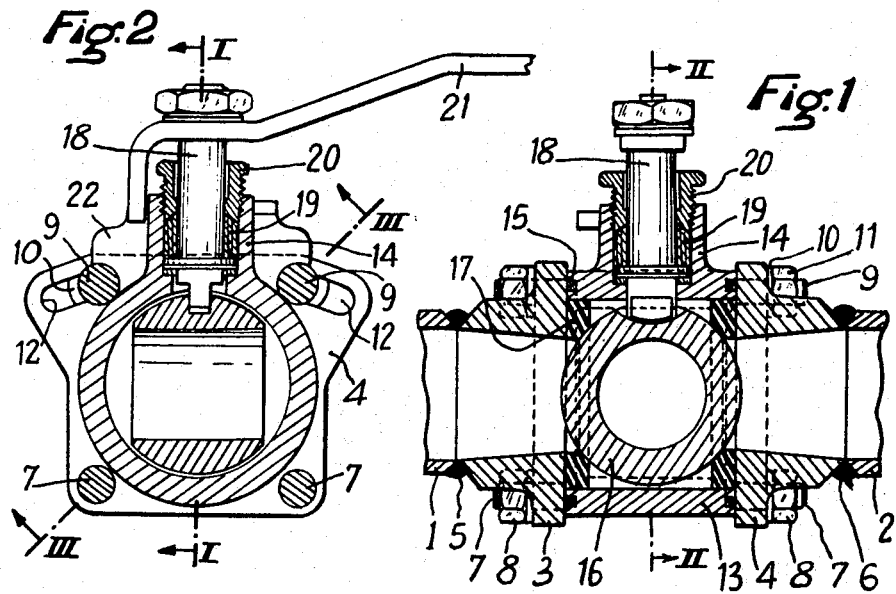
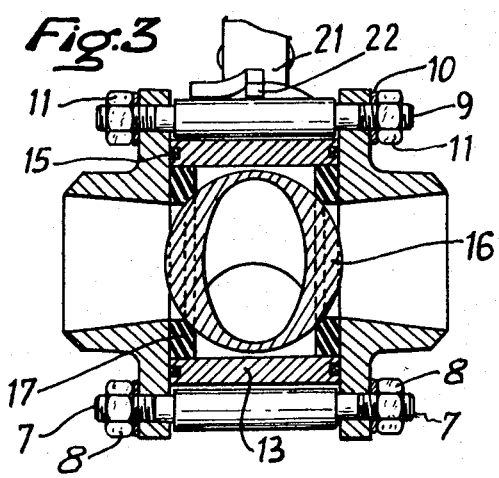
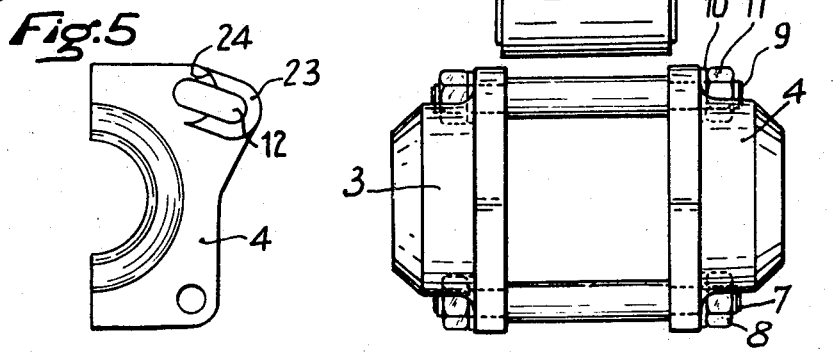
INVENTOR
RAYMOND ANDRÉ AVELINES
By Linton and Linton
ATTORNEYS

COCK WITH SPHERICAL CASING

This invention relates in general to cocks and valves and has specific reference to a cock having a spherical casing of the type comprising a valve member adapted to rotate between flexible sealing members disposed in a detachable casing permitting the inspection, cleaning or replacement of the sealing members. The essential object of this invention is to facilitate the assembling and disassembling of the valve assembly comprising the valve member proper and its control member, and the casing or body enclosing same while maintaining the pipe sections in operation during the assembling and disassembling steps. It is another object of this invention to automatically ensure the re-assembling of the casing elements in the proper position and also the mutual locking engagement of these elements in their assembled position.

These results are obtained by disposing the cock casing between two fastening flanges rigid with the two opposite pipe sections of the line in which the cock is to be inserted, said flanges being assembled by means of tie-bolts disposed at regular intervals about said casing without extending therethrough, one or more of said tie-bolts being adapted to slide in elongated holes formed in said flanges for freeing a passage of a width greater than that of the detachable casing of which the removal or refitting is obtained by means of a movement of translation thereof between said two flanges.

The possibility of causing a certain degree of slip of said tie-bolts enables these tie-bolts to maintain a sufficient coupling between the flanges during the disassembling and re-assembling steps and therefore to keep the pipe sections operative, as these pipe sections would tend to sag if this coupling were not provided.

In order to automatically obtain a proper re-positioning of the casing, the latter is advantageously provided with bearing surfaces adapted to bear against certain tie-bolts in the tightening position thereof.

Finally, the detachable cock casing is advantageously held in its operative position by means of said sliding tie-bolt or tie-bolts which are locked in this position by the engagement of their washers or equivalent members against stop means provided to this end on the outer faces of said fastening flanges.

In order to afford a clearer understanding of this invention and of the manner in which the same may be carried out in practice, reference will now be made to the attached drawing illustrating diagrammatically by way of example a typical form of embodiment thereof. In the drawing:

FIG. 1 is an axial section taken along the line I—I of FIG. 2, illustrating two sections of a pipe which are assembled by a cock according to this invention, shown in its closed position;

FIG. 2 is a cross-section taken along the line II—II of FIG. 1;

FIG. 3 is a diametral section taken along the line III—III of FIG. 2;

FIG. 4 is a side elevational view illustrating the pipe sections with the cock casing separated therefrom and shown in a position corresponding to its removal or its refitting, and FIG. 5 is an elevational half-view showing a detail to illustrate a typical means for locking the members retaining the detachable cock casing in the fastening flanges rigid with the pipe sections.

In the example illustrated in the drawing the two pipe sections between which the cock is mounted are designated by the reference numerals 1 and 2; they are each provided with a fastening flange 3, 4 and these flanges are spaced from each other to permit the insertion therebetween of the detachable body or casing of a cock or like valve device. Each flange may be secured for example by welding at 5 and 6 to the corresponding pipe section.

The two flanges are adapted to be assembled to each other by means of tie-bolts parallel to the axis of said pipe sections and comprising in this example on the one hand two lower tie-bolts 7 extending to corresponding aligned holes formed through the flanges 3 and 4, these tie-bolts being adapted to receive on their screw-threaded ends tightening nuts 8, and on the other hand two upper tie-bolts 9 receiving on each one of their screw-threaded ends a washer 10 and a tightening nut 11.

These upper tie-bolts 9 extend through elongated holes 12 formed in said flanges and in which said tie-rods 9 are adapted to slip in order to leave between them a space sufficient to permit the passage of the detachable cock casing or body as will be explained presently.

The detachable sealing assembly is carried by a casing or body 13 having substantially the shape of a cylinder formed with an integral upstanding hollow boss 14 for mounting the cock or valve control shaft. This casing has flat end faces each provided with an annular groove receiving a gasket or 0-ring 15 adapted to engage the registering face of the relevant flange. Within the casing or body 13 a valve member 16 having a spherical surface is mounted and adapted to revolve through one-fourth of a revolution about the axis of the shaft or boss 14 while engaging a pair of parallel resilient valve seals 17 fitted in said casing 13. The valve member is driven from a control shaft 18 extending through said hollow boss 14 and sealing means 19 clamped by a screw ring 20 engaging the tapped end of said hollow boss. The outer end of shaft 18 is adapted to be rigidly connected to a control lever or handle 21.

In a plane at right angles to its axis the casing 13 carries a pair of opposite upstanding lugs 22 adapted to bear against the aforesaid sliding tie-bolts 9 when these are brought to their tightening position.

Around that portion of each elongated hole 12 which receives a corresponding tie-bolt 9 therethrough in the position permitting the removal of said casing 13 (FIG. 5), the outer face of each flange 3, 4 may comprise an extra thickness portion 23 having its edge 24 directed towards the end of the elongated hole which receives the tie-bolt 9 in the tightening position, so as to constitute a shoulder adapted to lock in position the washer 10 associated with this tie-bolt 9 and therefore to prevent this tie-bolt 9 from sliding towards the removal position.

In the assembled position, the tie-bolts 9 engage the outer peripheral surface of the casing 13 and thus hold same in position while their washers 10 are locked against any transverse movement by engaging the edges 24 of said extra thickness portions 23 which prevent the sliding movement of said tie-bolts away from each other. The tightening of nuts 8 to 11 on tie-bolts 7 to 9 will ensure a uniform stress distribution among the annular gaskets or 0-rings of said casing 13.

When it is desired to check the internal condition of the valve assembly, the nuts 8 and 11 are slackened, thus eliminating the clamping of said gaskets 15 and allowing the washers 10 to move away, in the axial direction, from the outer faces of flanges 3 and 4 and thus clear the extra thickness portions 23 to subsequently permit the sliding movement of tie-bolts 9 away from each other in their elongated holes 12 to outer positions in which the gap formed between the shanks of these bolts is sufficient to permit the passage of the cock casing 13. When the tie-bolts 9 are in this outer position it is only necessary to pull the casing 13 by moving same with a movement of translation in a plane at right angles to the axis of the pipe sections, so that the casing 13 can be removed therefrom as shown in FIG. 4. After checking the valve member and if necessary replacing its sealing means 15 and 17, the reverse procedure is adhered to for re-assembling the device. During this procedure the lugs 22 of casing 13 will automatically re-engage the tie-bolts 9 when these are moved towards each other to their tightening position, whereby the mounting position of the casing is determined with precision. It is then only necessary to complete the uniform tightening of nuts 8 and 11.

It will be seen that the disassembling and assembling operations are particularly easy and that nevertheless the detachable casing 13 is constantly held in a properly aligned position with respect to the pipe sections.

The form of embodiment described hereinabove and illustrated in the accompanying drawing should not be construed as limiting the invention since various constructional modifications and variations may be contemplated without departing from the spirit and scope of the invention. Thus, notably, the number of tie-bolts may differ from the one shown and described, and the mounting and control means of the valve member may also differ without departing from the basic principle of the invention.

What I claim is:

1. A valve connectable to pipe sections comprising a valve casing having opposite flat end faces with openings in said faces, flexible sealing members positioned in said casing, a valve member rotatably mounted in said casing and capable of rotating between said flexible sealing members, a pair of flanges each connected to a pipe section and having a bore, said flanges being spaced apart with said casing detachably positioned therebetween with each casing end face against one of said flanges, and with each flange bore communicating with one of said casing openings, a plurality of tie-bolts extending through and between said flanges and at spaced intervals less than the width of said casing around and outside of said casing, nuts on said tie-bolts for tightening said flanges against said casing, each flange having at least one elongate opening through which one of said tie-bolts extends whereby said one of said tie-bolts can be moved when said nuts are loosened to provide a passage between said one of said tie-bolts and a second tie-bolt of a width slightly greater than that of said casing to permit the detachment or insertion of said casing relative to said flanges.

2. A valve as claimed in claim 1 wherein said casing has at least one bearing surface capable of engaging said one of said tie-bolts when said tie-bolt is in its flange tightening position.

3. A valve as claimed in claim 1 including washers mounted on said one of said tie-bolts each between one of said flanges and one of said nuts and stop means provided on said flanges each for engaging one of said washers and retaining said one of said tie-bolts when in its valve tightening position.

* * * * *